United States Patent [19]

Nakagawa et al.

[11] Patent Number: 4,670,349
[45] Date of Patent: Jun. 2, 1987

[54] ADHESIVE RESIN COMPOSITION

[75] Inventors: Mikio Nakagawa, Hiroshima; Koichiro Sato, Yamaguchi; Kuniaki Kanemoto; Akito Nishimura, both of Iwakuni, all of Japan

[73] Assignee: Mitsui Petrochemical Industries, Ltd., Tokyo, Japan

[21] Appl. No.: 809,764

[22] Filed: Dec. 17, 1985

[30] Foreign Application Priority Data

Dec. 20, 1984 [JP] Japan ................. 59-267416
Jan. 8, 1985 [JP] Japan ..................... 60-461

[51] Int. Cl.⁴ .............. C08L 23/26; C08L 23/16; C08L 51/06; C08L 23/08
[52] U.S. Cl. ................ 428/516; 525/73; 525/74; 525/78; 525/80; 525/81; 525/222; 525/240; 428/520
[58] Field of Search .......... 525/74, 78; 428/516

[56] References Cited

U.S. PATENT DOCUMENTS

| | | | |
|---|---|---|---|
| 3,437,629 | 4/1969 | Von Bramer et al. | 528/392 |
| 3,595,993 | 7/1971 | Brunson et al. | 525/74 |
| 3,652,725 | 3/1972 | Diaz et al. | 525/221 |
| 3,701,760 | 10/1972 | Hagemeyer et al. | 526/73 |
| 3,868,433 | 2/1975 | Bartz et al. | 525/74 |
| 4,299,745 | 11/1981 | Godfrey | 525/74 |
| 4,299,930 | 11/1981 | Boggs | 525/74 |

FOREIGN PATENT DOCUMENTS 53-127546 11/1978 Japan .

Primary Examiner—Carman J. Seccuro
Attorney, Agent, or Firm—Sherman and Shalloway

[57] ABSTRACT

An adhesive resin composition comprising
(A) 100 parts by weight of a polymer having a crystallinity, determined by X-ray diffractometry, of not more than 40% selected from the group consisting of an ethylene/vinyl acetate copolymer and ethylene/alpha-olefin random copolymers,
(B) 1 to 50 parts by weight of modified polyethylene having a melt flow rate of 0.01 to 50 g/10 minutes and containing 0.01 to 10% by weight of an unsaturated carboxylic acid or its derivative grafted thereto, and
(C) 1 to 125 parts by weight of a hydrogenated aromatic petroleum resin in which at least 70% of the romatic ring is hydrogenated;

provided that the total amount of the modified polyethylene (B) and the hydrogenated aromatic petroleum resin (C) is not more than 150 parts by weight.

12 Claims, No Drawings

ADHESIVE RESIN COMPOSITION

This invention relates to an adhesive resin composition. More specifically, it relates to an adhesive resin composition having excellent adhesion to a styrene-type resin layer and a layer of a saponified product of an olefin/vinyl acetate copolymer and excellent extrudability.

Saponified products of olefin/vinyl acetate copolymers, to be sometimes abbreviated as EVOH hereinafter, typified by a saponification product of an ethylene/vinyl acetate copolymer have excellent gas-barrier property, oil resistance and mechanical strength, but high permeability to water. Hence, EVOH cannot be used alone for the packaging films or hollow containers for packing or holding foods containing water. To remedy this defect, it was proposed to laminate a styrene-type resin (to be sometimes abbreviated as PS) or polyolefin resin which has excellent water resistance onto EVOH. Since the styrene-type resin or polyolefin resin has no polar group, its direct lamination to EVOH gives a laminate which has a very low delamination strength and cannot withstand practical use.

Various proposals have been made in order to remedy this defect. For example, Japanese Laid-Open Patent Publication No. 129271/1978 proposed mixtures of resins having excellent adhesion to a saponified product of an ethylene/vinyl acetate copolymer, such as ethylene/vinyl acetate copolymer, ethylene/ethyl acrylate copolymer, ethylene/methacrylate copolymer ionomer and a polyolefin modified with an unsaturated carboxylic acid, with a tackifier such as rosin, ester gum, a cyclopentadiene resin, a terpene resin or a beta-pinene resin. This patent document discloses a multilayer film obtained by co-extruding such a mixed resin and a saponified ethylene/vinyl acetate copolymer having an ethylene content of 20 to 50 mole % and a degree of saponification of at least 90%.

Japanese Laid-Open Patent Publication No. 147733/1978 proposes an adhesive resin composition composed of (A) an ethylene/vinyl acetate copolymer having a vinyl acetate content of 5 to 40% by weight and (B) a tackifier, the ratio of A:B being 50–99:50–1. This patent document discloses rosin, modified rosin, rosin derivatives, polyterpene resins, terpene-modified aliphatic hydrocarbon resins, cyclopentadiene resins or aromatic petroleum resins. The document also states that the adhesive resin composition can be extrusion-coated on low-density polyethylene, high-density polyethylene, ethylene/vinyl acetate copolymer, polyvinyl chloride, polyvinylidene chloride, polycarbonate, polystyrene, ABS, glass, wood and cloth.

Japanese Laid-Open Patent Publication No. 10384/1979 discloses a co-extruded laminate composed at least of a styrene-type resin layer and a layer of a resin composed mainly of an ethylene/vinyl acetate copolymer. The latter resin layer comprises 75 to 99% by weight of an ethylene/vinyl acetate copolymer containing 1 to 25% by weight of vinyl acetate and 25 to 1% by weight of a tackifier. The patent document likewise discloses rosin, ester gum, cyclopentadiene resin, terpene resins and beta-pinene resin as the tackifier.

Japanese Laid-Open Patent Publication No. 127546/1978 discloses an adhesive polyolefin resin comprising (a) 100 parts by weight of a modified polyolefin having grafted thereto 0.01 to 0.5% by weight of an unsaturated carboxylic acid or its anhydride, (b) 50 to 200 parts by weight of an ethylene/vinyl acetate copolymer having a vinyl acetate content of 10 to 40% by weight, and (c) 5 to 50 parts by weight of an aliphatic petroleum resin.

Japanese Laid-Open Patent Publication No. 18653/1978 discloses that a resin composition comprising 100 parts by weight of a carboxylated ethylene/vinyl acetate copolymer and 3 to 100 parts by weight of a petroleum resin containing an alicyclic saturated hydrocarbon in the skeleton or a side chain has excellent adhesiveness and low temperature heat sealability.

Japanese Laid-Open Patent Publication No. 8234/1982 discloses a heat-sealable resin composition having excellent peelability prepared by uniformly melt-mixing (A) 15 to 80% by weight of an ethylene/alpha,beta-unsaturated carboxylic acid copolymer or its metal neutralization product, (B) 10 to 80% by weight of a resin selected from the group consisting of polyethylene, ethylene/alpha-olefin copolymers, ethylene/vinyl ester copolymers and ethylene/alpha,beta-unsaturated carboxylic acid esters, (C) 3 to 30% by weight of a tackifying resin, and (D) 300 ppm to 10% by weight of an additive selected from fatty acid amides, fatty acid bisamides, polyethylene glycol, hydrogenated castor oil, polyethylene wax and silica. The patent document describes aliphatic hydrocarbon resins, alicyclic hydrocarbon resins, aromatic hydrocarbon resins, rosins and styrene-type resins as the tackifying resin.

These resin compositions, however, do not prove to be satisfactory in very respect, and for example have low levels of color and weatherability or an insufficient adhesion to PS and EVOH. It is desired therefore to improve such resin compositions further.

It is an object of this invention to provide an adhesive resin composition of a novel chemical composition.

Another object of this invention is to provide an adhesive resin composition having excellent adhesion particularly to a styrene-type resin and a saponified product of an olefin/vinyl acetate copolymer.

Still another object of this invention is to provide an adhesive resin composition which has excellent color, weatherability and extrudability and gives a film of a uniform thickness by extrusion.

Further objects and advantages of this invention will become apparent from the following description.

According to this invention, these objects and advantages are achieved by an adhesive resin composition comprising (A) 100 parts by weight of a polymer having a crystallinity, determined by X-ray diffractometry, of not more than 40% selected from the group consisting of an ethylene/vinyl acetate copolymer and ethylene/alpha-olefin random copolymers, (B) 1 to 50 parts by weight of modified polyethylene having a melt flow rate of 0.01 to 50 g/10 minutes and containing 0.01 to 10% by weight of an unsaturated carboxylic acid or its derivative grafted thereto, and (C) 1 to 125 parts by weight of a hydrogenated aromatic petroleum resin in which at least 70% of the aromatic ring is hydrogenated;

provided that the total amount of the modified polyethylene (B) and the hydrogenated aromatic petroleum resin (C) is not more than 150 parts by weight.

Component (A) of the resin composition of this invention is selected from an ethylene/vinyl acetate copolymer and ethylene/alpha-olefin random copolymers. These copolymers have a crystallinity, determined by X-ray diffractometry, of not more than 40%.

The ethylene/vinyl acetate copolymer preferably has a vinyl acetate unit content of 5 to 40% by weight, especially 10 to 35% by weight. If the vinyl acetate unit content is less than 5% by weight, the resulting adhesive resin composition tends to have insufficient adhesion to styrene-type resins. When it exceeds 40% by weight, the compatibility with the modified polyethylene (B) and the hydrogenated aromatic petroleum resin (C) tends to decrease, and the adhesion of the composition to a saponified product of an olefin/vinyl acetate copolymer tends to be insufficient. The ethylene/vinyl acetate copolymer preferably has a melt flow rate ($MFR_2$), measured in accordance with ASTM D1238.E, of 0.1 to 30 g/10 min., especially 0.5 to 10 g/10 min. If $MFR_2$ is less than 0.1 g/10 min., the melt viscosity of the resulting adhesive resin composition is too high. If it exceeds 30 g/10 min., the melt viscosity of the resulting adhesive resin composition is too low. In either case, the adhesive resin composition tends to have reduced extrudability.

The ethylene/alpha-olefin random copolymers preferably have an ethylene unit content of 30 to 95 mole %, especially 40 to 92 mole %. The ethylene/alpha-olefin random copolymers also preferably have a melt flow rate ($MFR_2$), measured in accordance with ASTM D 1238.L, of 0.1 to 50 g/10 min., especially 0.2 to 20 g/10 min. If $MFR_2$ is less than 0.1 g/10 min., the melt viscosity of the resulting adhesive resin composition is too high. If it exceeds 50 g/10 min., the melt viscosity of the adhesive resin composition is too low. In either case, the adhesive resin composition does not have sufficient extrudability, and tends to show reduced adhesion to styrene-type resins and a saponified product of an olefin/vinyl acetate copolymer.

Preferably, the ethylene/alpha-olefin random copolymer has a density of 0.850 to 0.900 g/cm$^3$, especially 0.855 to 0.895 g/cm$^3$. If its density exceeds 0.900 g/cm$^3$, it tends to have a decreased strength of adhesion to styrene-type resins. The alpha-olefin constituting the ethylene/alpha-olefin random copolymer is preferably an alpha-olefin having 3 to 20 carbon atoms such as propylene, 1-butene, 1-hexene, 4-methyl-1-pentene, 1-octene, 1-decene, 1-tetradecene and 1-octadecene. These alpha-olefins may be used singly or in combination.

The ethylene/vinyl acetate copolymer and the ethylene/alpha-olefin random copolymers used in this invention have a crystallinity, determined by X-ray diffractometry, of not more than 40%, preferably not more than 30%, and are lowly crystalline, or amorphous (0%). If their crystallinity exceeds 40%, they have an insufficient strength of adhesion to styrene-type resins. In addition, the above copolymers (A) usually have a melting point, measured in accordance with ASTM D 3418, of not more than 100° C.

The modified polyethylene as component (B) of the adhesive resin composition of this invention has a melt flow rate, measured in accordance with ASTM D 1238.E, of 0.01 to 50 g/10 min. The amount of the unsaturated carboxylic acid or its derivative grafted to it is 0.01 to 10% by weight. Preferably, the modified polyethylene has a melt flow rate of 0.5 to 10 g/10 min. and contains 0.1 to 5% by weight of the unsaturated carboxylic acid or its derivative grafted thereto. If the amount of the grafted monomer is less than 0.01% by weight, the resulting adhesive resin composition has poor adhesion strength to a saponified product of an olefin/vinyl acetate copolymer. On the other hand, if it is more than 10% by weight, the modified polyethylene itself has a high crosslinking density and a large degree of molecular deterioration, and therefore, the resulting adhesive resin composition has poor adhesion strength to saponified products of ethylene/vinyl acetate copolymers and to styrene-type resins.

The modified polyethylene (B) can be produced by grafting the unsaturated carboxylic acid or its derivative to polyethylene as a base.

The base polyethylene may be a homopolymer of ethylene, and a copolymer of ethylene with a minor proportion of an alpha-olefin such as propylene, 1-butene, 4-methyl-1-pentene, 1-hexene, 1-octene, and 1-decene. The proportion of the other alpha-olefin to be copolymerized is usually not more than about 10 mole %.

Preferably, the base polyethylene has a melt flow rate, measured in accordance with ASTM D 1238,E, of 0.01 to 100 g/10 min., a density of 0.905 to 0.980 g/cm$^3$, and a crystallinity, determined by X-ray diffractometry, of not more than about 45%.

Examples of the unsaturated carboxylic acids to be grafted include acrylic acid, maleic acid, fumaric acid, tetrahydrophthalic acid, itaconic acid, citraconic acid, crotonic acid, isocrotonic acid, and Nadic acid ® (i.e., endocis-bicyclo[2.2.1]hept-5-ene-2,3-dicarboxylic acid). Examples of their derivatives include acid halides, amides, imides, anhydrides and esters of these unsaturated carboxylic acids, such as maleyl chloride, maleimide, maleic anhydride, citraconic anhydride, monomethyl maleate, dimethyl maleate and glycidyl maleate.

Of these, the unsaturated dicarboxylic acids and their acid anhydrides are preferred. Maleic acid and Nadic acid ®, and their anhydrides are especially preferred.

The modified polyethylene can be produced by grafting the monomer selected from the above-exemplified unsaturated carboxylic acids and their derivatives to base polyethylene by various known methods. For example, the graft copolymerization is carried out by adding the grafting monomer to molten polyethylene or dissolved polyethylene in a solvent. In either case, the reaction is preferably carried out in the presence of a radical initiator in order to graft the grafting monomer efficiently to the base polyethylene. The graft reaction is carried out usually at a temperature of 60° to 350° C. The amount of the radical initiator is usually 0.001 to 1 part by weight per 100 parts by weight of the base polyethylene. Suitable radical initiators include organic peroxides and organic peresters such as benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butyl peroxyisopropyl)benzene, lauroyl peroxide, tert-butyl peracetate, 2,5-dimethyl-2,5-di(butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds such as azobisisobutyronitrile, and dimethyl azoisobutyrate. Of these, dicumyl peroxide, dialkyl peroxides such as di-tert-butyl peroxide, 2,5-dimethyl-2,5-di(tert-butylperoxy)hexyne-3, 2,5-dimethyl-2,5-di(-tert-butylperoxy)hexane, 1,4-bis(tert-butylperoxyisopropyl)benzene are preferred.

The modified polyethylene (B) may be partly diluted with the base polyethylene, in which case the amount of the grafting monomer should be within the above range based on the total weight of these polyethylenes.

Component (C) of the resin composition of this invention is a hydrogenated aromatic petroleum resin in which at least 70% of the aromatic ring is hydrogenated.

The hydrogenated aromatic petroleum resin can be produced by various methods. For example, it is produced by polymerizing at least one polymerizable aromatic hydrocarbon selected, for example, from styrene, alpha-methylstyrene, vinyltoluene, vinylxylene, propenylbenzene, indene, methylindene and ethylindene, and hydrogenating the resulting aromatic petroleum resin; or by polymerizing a fraction having a boiling point of 150° to 300° C. obtained as a by-product in the cracking or reforming of petroleum, and hydrogenating the resulting aromatic petroleum resin.

The above hydrogenated product may also be one derived from an aromatic petroleum resin having a small amount of an aliphatic hydrocarbon copolymerized therewith. Examples of the aliphatic hydrocarbon monomer to be copolymerized in this case include butene, pentene, hexene, heptene, octene, butadiene, pentadiene, cyclopentadiene and dicyclopentadiene. A petroleum fraction having a boiling point of 20° to 300° C. can also be advantageously used as a raw material for the production of the aromatic petroleum resin since it is a mixture of a major proportion of aromatic hydrocarbons and a minor proportion of aliphatic hydrocarbons. The polymerization is carried out by well known methods, usually by cationic polymerization in the presence of a Friedel-Crafts catalyst. The hydrogenation of the resulting aromatic petroleum resin may be carried out by heating the resin in the presence of a metal catalyst such as nickel, palladium, cobalt, platinum, ruthenium or rhodium or a catalyst comprising an oxide of such a metal under a hydrogen pressure of 50 to 500 kg/cm$^2$.

The resulting hydrogenated aromatic petroleum resin has a high degree of hydrogenation of the aromatic ring, and particularly is a highly hydrogenated product in which the ratio of the aromatic rings of the aromatic petroleum resin converted to cyclohexyl groups is at least 70%. If the degree of hydrogenation is less than 70%, the hydrogenated aromatic petroleum resin (C) has poor compatibility with the ethylene/vinyl acetate copolymer, the ethylene/alpha-olefin random copolymer or the modified polyethylene, and the resulting adhesive resin composition has poor adhesion to polystyrene-type resins. Moreover, the adhesive resin composition has low weatherability and may fade.

The hydrogenated aromatic petroleum resin (C) used in this invention preferably has a degree of hydrogenation of at least 80%, especially at least 85%. Preferably, the hydrogenated aromatic petroleum resin (C) has a softening point, determined by the ring and ball method, of 80° to 150° C., especially 110° to 140° C. It is further preferred that the hydrogenated aromatic petroleum resin (C) have a bromine number of not more than 10, especially not more than 9.

The adhesive resin composition of this invention comprises 100 parts by weight of the polymer (A), 1 to 50 parts by weight of the modified polyethylene (B) and 1 to 125 parts by weight of the hydrogenated aromatic petroleum resin (C), provided that the total amount of the modified polyethylene (B) and the hydrogenated aromatic petroleum resin (C) is not more than 150 parts by weight.

If the amount of the modified polyethylene is less than 1 part by weight, the adhesion of the adhesive resin composition to a saponified product of an olefin/vinyl acetate copolymer is reduced. If it exceeds 50% by weight, the resulting adhesive resin composition has reduced adhesion to styrene-type resins. If the amount of the hydrogenated aromatic petroleum resin (C) is less than 1 part by weight, the resulting adhesive resin composition has reduced adhesion not only to saponified olefin-vinyl acetate copolymer but also to styrene-type resins. On the other hand, when it exceeds 125 parts by weight, the moldability of the adhesive resin composition is reduced. If the amounts of the modified polyethylene (B) and the hydrogenated aromatic petroleum resin (C) are within the above-specified range but the total amount of these exceeds 150 parts by weight, the objects of this invention cannot be achieved.

Preferably, the adhesive resin composition of this invention comprises 100 parts by weight of the polymer (A), 2 to 23 parts by weight of the modified polyethylene (B) and 3 to 46 parts by weight of the hydrogenated aromatic petroleum resin (C).

The adhesive resin composition of this invention may be produced by mixing predetermined amounts of the polymer (A), the modified polyethylene (B) and the hydrogenated aromatic petroleum resin (C) by a mixer such as a Henschel mixer, a V blender, a ribbon blender or a tumbler blender; or after mixing, melt-kneading the mixture by a single screw extruder, a twin screw extruder, a kneader, a Banbury mixer, etc. and then granulating or pulverizing the mixture.

The adhesive resin composition of this invention may further include heat stabilizers, weatherability stabilizers, antistatic agents, pigments, dyes, rustproofing agents, etc. in amounts which do not impair the objects of this invention.

The adhesive resin composition of this invention can be used to bond various polymers to each other, and advantageously to bond a styrene-type resin (PS) to a saponified olefin/vinyl acetate copolymer (EVOH).

The adhesive resin composition of this invention may be used to produce a laminated structure of PS and EVOH. This laminated structure may be produced, for example, by melting the adhesive resin composition of this invention, PS and EVOH in separate extruders, feeding the melts to a die of a three layer structure, and co-extruding them with the adhesive resin composition of this invention as an interlayer; or by first forming a layer of PS and a layer of EVOH, and melt-extruding the adhesive resin composition of this invention between the two layers (the sandwich laminating method). The co-extruding method is preferred because it can achieve a good delamination strength. The co-extruding method may be divided into a T-die method using a flat die and an inflation method using a circular die. The flat die may be a single manifold die using a black-box or a multimanifold die. The inflation method may be carried out by using any known dies.

Examples of the styrene-type resin used for producing such a laminated structure using the adhesive resin composition of this invention are polystyrene, high-impact polystyrene (rubber-blended polystyrene), AS resin (SAN) and ABS resin.

The saponified olefin/vinyl acetate copolymer used in the above laminated structure may be one obtained, for example, by saponifying an olefin/vinyl acetate copolymer having an olefin content of 15 to 60 mole %, preferably 25 to 50 mole % to a degree of saponification of at least 50%, preferably at least 90%. If the olefin content is less than 15 mole %, the resulting saponified copolymer is susceptible to thermal decomposition and difficult to melt-mold and also has poor stretchability. It also tends to swell upon water absorption and has poor water resistance. If the olefin content exceeds 60 mole %, the saponified copolymer has poor resistance to gas permeation. If the degree of saponification is less than 50%, the resulting saponified copolymer also has poor resistance to gas permeation. Examples of the olefin to be copolymerized are ethylene, propylene, 1-butene, 1-hexene, 4-methyl-1-pentene, 1-octene, 1-decene, 1-tetradecene and 1-octadecene. A saponified ethylene/vinyl acetate copolymer is especially preferred from the standpoint of mechanical strength and moldability.

Desirably, in the above laminated structure, the PS layer has a thickness of 0.02 to 5 mm, the EVOH layer has a thickness of 0.01 to 1 mm, and the adhesive layer has a thickness of 0.01 to 1 mm.

Since the adhesive resin composition of this invention has excellent adhesion to PS and EVOH, color, weatherability, extrudability and film uniformity than the conventional compositions of ethylene/vinyl acetate copolymer and petroleum resins, it can be conveniently used to laminate PS and EVOH to provide packaging films, pressure-formed cups and hollow bottles which have excellent gas barrier property, moisture proofness and transparency and are useful for packaging or holding foods and medicines.

The following examples illustrate the present invention more specifically. It should be understood that the invention is in no way limited by these examples unless it departs from its scope described and claimed herein.

EXAMPLES 1–4 AND COMPARATIVE EXAMPLES 1–2

(1) In each run, an ethylene/vinyl acetate copolymer (to be referred to as EVA-I hereinafter; vinyl acetate (VA) content 19% by weight, $MFR_2$ 2.5 g/10 min., density 0.94 g/cm$^3$), maleic anhydride-grafted high density polyethylene (to be referred to as HDPE; amount of maleic anhydride grafted 2.1 g/100 g of polymer, $MFR_2$ 1.43 g/10 min., density 0.96 g/cm$^3$), and a hydrogenated aromatic petroleum resin (tradename Alcon P125, softening point 125° C., bromine number 2; a product of Arakawa Chemical Co., Ltd.) were mixed in the proportions shown in Table 1 by a Henschel mixer. The mixture was kneaded and granulated in a single-screw extruder (with a dulmage screw having a diameter of 40 mm) kept at 200° C. to give an adhesive resin composition.

(2) A three-layer water-cooled inflation film was produced under the following conditions by using high-impact polystyrene (Toporex HI830-05, a tradename for a product of Mitsui Toatsu Chemicals, Inc.), a saponified ethylene/vinyl acetate copolymer ($MFR_2$ 1.3 g/10 min., density 1.19 g/cm$^3$, ethylene content 32 mole %; tradename Kuraray Eval EP-F, a product of Kuraray Inc.) and the adhesive resin composition prepared in section (1).

Layer construction of the film
  PS (outside)/adhesive resin composition (intermediate)/saponified ethylene/vinyl acetate copolymer (inside)=100/20/20 (microns in thickness)
Extruders
  40 mm φ extruder, 210° C. (for the outside layer)
  40 mm φ extruder, 210° C. (for the intermediate layer)
  40 mm φ extruder, 210° C. (for the inside layer)
Molding speed
  15 m/min.

The adhesion strength between the PS layer and the adhesive resin composition layer of the resulting three-layer film $F_{PS}$, g/15 mm width), and the adhesion strength between the saponified ethylene/vinyl acetate copolymer layer and the adhesive resin composition ($F_{EVOH}$, g/15 mm width) were measured by a 180° peel test at a peeling speed of 300 mm/min. The results are shown in Table 1.

EXAMPLE 5

Example 3 was repeated except that EVA-II having a VA content of 25% by weight, an $MFR_2$ of 2.0 g/10 min. and a density of 0.95 g/cm$^3$ was used instead of EVA-I, and the proportions of the three components of the resin composition were changed as shown in Table 1. The results are shown in Table 1.

EXAMPLE 6

Example 5 was repeated except that a hydrogenated aromatic petroleum resin (tradename Alcon P135, softening point 135° C., bromine number 2; a product of Arakawa Chemical Co., Ltd.) was used instead of Alcon P125. The results are shown in Table 1.

EXAMPLE 7

Example 5 was repeated except that a hydrogenated aromatic petroleum resin (tradename Alcon P90, softening point 90° C., bromine number 2; a product of Arakawa Chemical Co., Ltd.) was used instead of Alcon P125. The results are shown in Table 1.

EXAMPLE 8

Example 3 was repeated except that a maleic anhydride-grafted ethylene/1-butene copolymer (1-butene content 3.2 mole %, maleic anhydride grafted 2.2 g/100 g of polymer, $MFR_2$ 1.0 g/10 min.) was used instead of the maleic anhydride grafted-HDPE. The results are shown in Table 1.

COMPARATIVE EXAMPLE 3

Example 2 was repeated except that maleic anhydride-grafted HDPE (maleic anhydride grafted 0.3 g/100 g, $MFR_2$ 4.1 g/10 min., density 0.96 g/cm$^3$) and Alcon P125 were used in the proportions shown in Table 1. The results are shown in Table 1.

COMPARATIVE EXAMPLE 4

Example 5 was repeated except that an aliphatic hydrocarbon resin (softening point 100° C., bromine number 40, number average molecular weight 1200) was used instead of Alcon P125. The results are shown in Table 1.

COMPARATIVE EXAMPLE 5

Example 5 was repeated except that an aliphatic hydrogenated hydrocarbon resin (softening point 100° C., bromine number 5, average molecular weight 1300) was used instead of Alcon P125. The results are shown in Table 1.

TABLE 1

| Example (Ex.) or Comparative Example (CEx.) | Composition (% by weight) | | | Properties | | |
|---|---|---|---|---|---|---|
| | Ethylene/ vinyl acetate copolymer | Modified poly-ethylene | Hydrogenated aromatic petroleum resin | $F_{PS}$ (g/15 mm width) | $F_{EVOH}$ (g/15 mm width) | Color |
| Ex. 1 | 93 | 2 | 5 | 270 | 420 | Colorless |
| Ex. 2 | 88 | 2 | 10 | 340 | 600 | Colorless |
| Ex. 3 | 73 | 2 | 25 | 520 | 570 | Colorless |
| Ex. 4 | 70 | 5 | 25 | 500 | 860 | Colorless |
| Ex. 5 | 73 | 2 | 25 | 630 | 500 | Colorless |
| Ex. 6 | 73 | 2 | 25 | 620 | 430 | Colorless |
| Ex. 7 | 73 | 2 | 25 | 370 | 320 | Colorless |
| Ex. 8 | 73 | 2 | 25 | 640 | 510 | Colorless |
| CEx. 1 | 75 | — | 25 | 490 | 70 | Colorless |
| CEx. 2 | 95 | 5 | — | 80 | 340 | Colorless |
| CEx. 3 | — | 75 | 25 | 20 | 150 | Colorless |
| CEx. 4 | 73 | 2 | 25 | 80 | 130 | Yellow |
| CEx. 5 | 73 | 2 | 25 | 110 | 120 | Colorless |

EXAMPLES 9–13 AND COMPARATIVE EXAMPLES 6–7

(1) In each run, an ethylene/propylene random copolymer (to be referred to as EPR-I; ethylene content 80 mole %, $MFR_2$ 1.2 g/10 min., density 0.88 g/cm$^3$, crystallinity 6%), maleic anhydride-grafted high density polyethylene (to be referred to as MAH-HDPE; amount of maleic anhydride grafted 2.1 g/100 g of polymer, $MFR_3$ 2.4 g/10 min., density 0.960 g/cm$^3$, crystallinity 76%), and a hydrogenated aromatic petroleum resin (tradename Alcon P125, softening point 125° C., bromine number 2; a product of Arakawa Chemical Co., Ltd.) were mixed in the proportions shown in Table 2 by a tumbler mixer. The mixture was kneaded and granulated in a single-screw extruder (with a dulmage screw having a diameter of 40 mm) kept at 200° C. to give an adhesive resin composition.

(2) A three-layer water-cooled inflation film was produced under the following conditions by using high-impact polystyrene (Toporex HI830-05, a tradename for a product of Mitsui Toatsu Chemicals, Inc.), a saponified ethylene/vinyl acetate copolymer ($MFR_2$ 1.3 g/10 min., density 1.19 g/cm$^3$, ethylene content 32 mole %; tradename Kuraray Eval EP-F, a product of Kuraray Inc.) and the adhesive resin composition prepared in section (1).

Layer construction of the film
  PS (outside)/adhesive resin composition (intermediate/saponified ethylene/vinyl acetate copolymer (inside) = 100/20/20 (microns in thickness)
Extruders
  40 mm φ extruder, 210° C. (for the outside layer)
  40 mm φ extruder, 210° C. (for the intermediate layer)
  40 mm φ extruder, 210° C. (for the inside layer)
Molding speed
  15 m/min.

The adhesion strength between the PS layer and the adhesive resin composition layer of the resulting three-layer film ($F_{PS}$, g/15 mm width), and the adhesion strength between the saponified ethylene/vinyl acetate copolymer layer and the adhesive resin composition ($F_{EVOH}$, g/15 mm width) where measured by a 180° peel test at a peeling speed of 300 mm/min. The results are shown in Table 2.

EXAMPLE 14

Example 13 was repeated except that ethylene/1-butene random copolymer (EBR-I; ethylene content 90 mole %, $MFR_2$ 7.0 g/10 min., density 0.887 g/cm$^3$, crystallinity 15%) was used instead of EPR-I. The results are shown in Table 2.

EXAMPLE 15

Example 12 was repeated except that a hydrogenated aromatic petroleum resin (tradename Alcon P135, softening point 135° C., bromine number 2; a product of Arakawa Chemical Co., Ltd) was used instead of Alcon P125. The results are shown in Table 2.

EXAMPLE 16

Example 12 was repeated except that a hydrogenated aromatic petroleum resin (tradename Alcon P90, softening point 90° C., bromine number 2; a product of Arakawa Chemical Co., Ltd) was used instead of Alcon P125. The results are shown in Table 2.

EXAMPLE 17

Example 12 was repeated except that maleic anhydride-grafted ethylene/1-butene copolymer (1-butene content 3.2 mole %, density 0.930 g/cm$^3$, crystallinity 55%) was used instead of MAH-HDPE. The results are shown in Table 2.

COMPARATIVE EXAMPLE 8

Example 10 was repeated except that maleic anhydride-grafted HDPE (maleic anhydride grafted 0.3 g/100 g of polymer, $MFR_2$ 4.1 g/10 min., density 0.96 g/cm$^3$, crystallinity 76%) and Alcon P125 were used in the proportions indicated in Table 2. The results are shown in Table 2.

COMPARATIVE EXAMPLE 9

Example 10 was repeated except that ethylene/vinyl acetate copolymer (EVA; $MFR_2$ 2.5 g/10 min., vinyl acetate content 19% by weight) and Alcon P125 were used in the proportions indicated in Table 2. The results are shown in Table 2.

TABLE 2

| Example (Ex.) or Comparative Example (CEx.) | Composition (% by weight) | | | Properties | | |
|---|---|---|---|---|---|---|
| | Ethylene/ alpha-olefine copolymer | Modified poly-ethylene | Hydrogenated aromatic petroleum resin | $F_{PS}$ (g/15 mm width) | $F_{EVOH}$ (g/15 mm width) | Color |
| Ex. 9 | 93 | 2 | 5 | 680 | 950 | Colorless |
| Ex. 10 | 88 | 2 | 10 | 870 | 1030 | Colorless |
| Ex. 11 | 80 | 15 | 10 | 570 | Peeling impossible | Colorless |
| Ex. 12 | 73 | 2 | 25 | Peeling impossible | 1130 | Colorless |
| Ex. 13 | 70 | 5 | 25 | Peeling impossible | 1130 | Colorless |
| Ex. 14 | 70 | 5 | 25 | 870 | Peeling impossible | Colorless |
| Ex. 15 | 73 | 2 | 25 | 750 | 1100 | Colorless |
| Ex. 16 | 73 | 2 | 25 | 650 | 870 | Colorless |
| Ex. 17 | 73 | 2 | 25 | Peeling impossible | 1200 | Colorless |
| CEx. 6 | 75 | — | 25 | Peeling impossible | 60 | Colorless |
| CEx. 7 | 95 | 5 | — | 70 | 870 | Colorless |
| CEx. 8 | — | 75 | 25 | 30 | 360 | Colorless |
| CEx. 9 | 75 | — | 25 | 490 | 80 | Colorless |

What is claimed is:

1. An adhesive resin composition having good adhesion to both styrene resins and saponified ethylene/vinyl acetate copolymers comprising
   (A) 100 parts by weight of a polymer having a crystallinity, determined by X-ray diffractometry, of not more than 40% selected from the group consisting of an ethylene/vinyl acetate copolymer having a melt flow rate of 0.1 to 30 g/10 min. and ethylene/alpha-olefin random copolymers having a melt flow rate of 0.1 to 50 g/10 min.,
   (B) 1 to 50 parts by weight of modified polyethylene having a melt flow rate of 0.01 to 50 g/10 minutes and containing 0.01 to 10% by weight of an unsaturated carboxylic acid or its derivative grafted thereto, and
   (C) 1 to 125 parts by weight of a hydrogenated aromatic petroleum resin in which at least 70% of the aromatic ring is hydrogenated;
provided that the total amount of the modified polyethylene (B) and the hydrogenated aromatic petroleum resin (C) is not more than 150 parts by weight.

2. The composition of claim 1 wherein the component (A) is the ethylene/vinyl acetate copolymer and the ethylene/vinyl acetate copolymer (A) has a vinyl acetate unit content of 5 to 40% by weight.

3. The composition of claim 1 wherein the component (A) is the ethylene/alpha-olefin random copolymer and the ethylene/alpha-olefin random compolymer (A) has an ethylene unit content of 30 to 95 mole %.

4. The composition of claim 1 wherein the component (A) is the ethylene/alpha-olefin random copolymer and the ethylene/alpha-olefin random copolymer (A) is a random copolymer of ethylene with an alpha-olefin having 3 to 20 carbon atoms.

5. The composition of claim 1 wherein the polymer (A) has a crystallinity, determined by X-ray diffractometry, of not more than 30%.

6. The composition of claim 1 wherein the modified polyethylene (B) has a melt flow rate of 0.5 to 10 g/10 min.

7. The composition of claim 1 wherein the modified polyethylene (B) contains 0.1 to 5% by weight of the unsaturated carboxylic acid or its derivative grafted thereto.

8. The composition of claim 1 wherein at least 80% of the aromatic group of the aromatic petroleum resin is hydrogenated.

9. The composition of claim 1 wherein the hydrogenated aromatic petroleum resin (C) has a softening point of 80° to 150° C.

10. The composition of claim 1 wherein the hydrogenated aromatic petroleum resin (C) has a bromine number of not more than 10.

11. The composition of claim 1 comprising 100 parts by weight of the polymer (A), 2 to 23 parts by weight of the modified polyethylene and 3 to 46% by weight of the hydrogenated aromatic petroleum resin (C).

12. A laminated structure which comprises
   (1) a styrene resin layer,
   (2) a saponified olefin/vinyl acetate polymer layer, and
   (3) an adhesive resin layer bonding said layers (1) and (2),
said adhesive resin layer being formed by an adhesive resin composition comprising
   (A) 100 parts by weight of a polymer having a crystallinity, determined by X-ray diffractometry, of not more than 40% selected from the group consisting of an ethylene/vinyl acetate copolymer having a melt flow rate of 0.1 to 30 g/10 min, and ethylene/alpha-olefin random copolymers having melt flow rate of 0.1 to 50 g/10 min.,
   (B) 1 to 50 parts by weight of modified polyethylene having a melt flow rate of 0.01 to 50 g/10 minutes and containing 0.01 to 10% by weight of an unsaturated carboxylic acid or its derivative grafted thereto, and
   (C) 1 to 125 parts by weight of a hydrogenated aromatic petroleum resin in which at least 70% of the aromatic ring is hydrogenated;
provided that the total amount of the modified polyethylene (B) and the hydrogenated aromatic petroleum resin (C) is not more than 150 parts by weight.

* * * * *

UNITED STATES PATENT AND TRADEMARK OFFICE
CERTIFICATE OF CORRECTION

PATENT NO. : 4,670,349
DATED : June 2, 1987
INVENTOR(S) : MIKIO NAKAGAWA, ET AL.

It is certified that error appears in the above-identified patent and that said Letters Patent is hereby corrected as shown below:

Column 11, line 52, claim 3, delete "compolymer", insert --copolymer--.

Signed and Sealed this

First Day of March, 1988

Attest:

DONALD J. QUIGG

Attesting Officer

Commissioner of Patents and Trademarks